United States Patent [19]

Corio

[11] Patent Number: 5,317,145
[45] Date of Patent: May 31, 1994

[54] RADIATION SOURCE DETECTOR AND TRACKER CONTROL HAVING A SHADE POLE AND RADIATION RESPONSIVE SURFACE IN THE SHAPE OF NARROW BANDS

[75] Inventor: Ronald P. Corio, Albuquerque, N. Mex.

[73] Assignee: Wattsun Corporation, Albuquerque, N. Mex.

[21] Appl. No.: 56,822

[22] Filed: Apr. 30, 1993

Related U.S. Application Data

[63] Continuation of Ser. No. 815,385, Dec. 31, 1991, abandoned.

[51] Int. Cl.$^5$ .............................................. G01J 1/20
[52] U.S. Cl. .................................. 250/203.4; 126/577
[58] Field of Search ........................... 250/203.4, 216; 126/425, 577; 356/141, 152

[56] References Cited

U.S. PATENT DOCUMENTS

| | | |
|---|---|---|
| 3,229,102 | 1/1966 | Spencer et al. . |
| 3,370,293 | 2/1968 | Green . |
| 3,917,942 | 11/1975 | McCoy ..................... 250/203.4 |
| 3,996,460 | 12/1976 | Smith ......................... 250/203 R |
| 4,082,947 | 4/1978 | Haywood et al. ........... 250/203 R |
| 4,179,612 | 12/1979 | Smith ......................... 250/203 R |
| 4,225,781 | 9/1980 | Hammons ................... 250/203.4 |
| 4,672,101 | 6/1987 | Cofield ....................... 250/203.4 |

Primary Examiner—David C. Nelms
Assistant Examiner—T. Davenport
Attorney, Agent, or Firm—H. Michael Brucker

[57] ABSTRACT

A tracker controller system in which a pair of photo-resistive cadmium sulfide sensors mounted in the shadow of a shade pole generate a voltage signal proportional to their resistive values which signal is delivered to a comparator circuit that causes a tracker driver to operate when the voltage signal falls outside of a voltage window established by the comparator circuit.

7 Claims, 5 Drawing Sheets

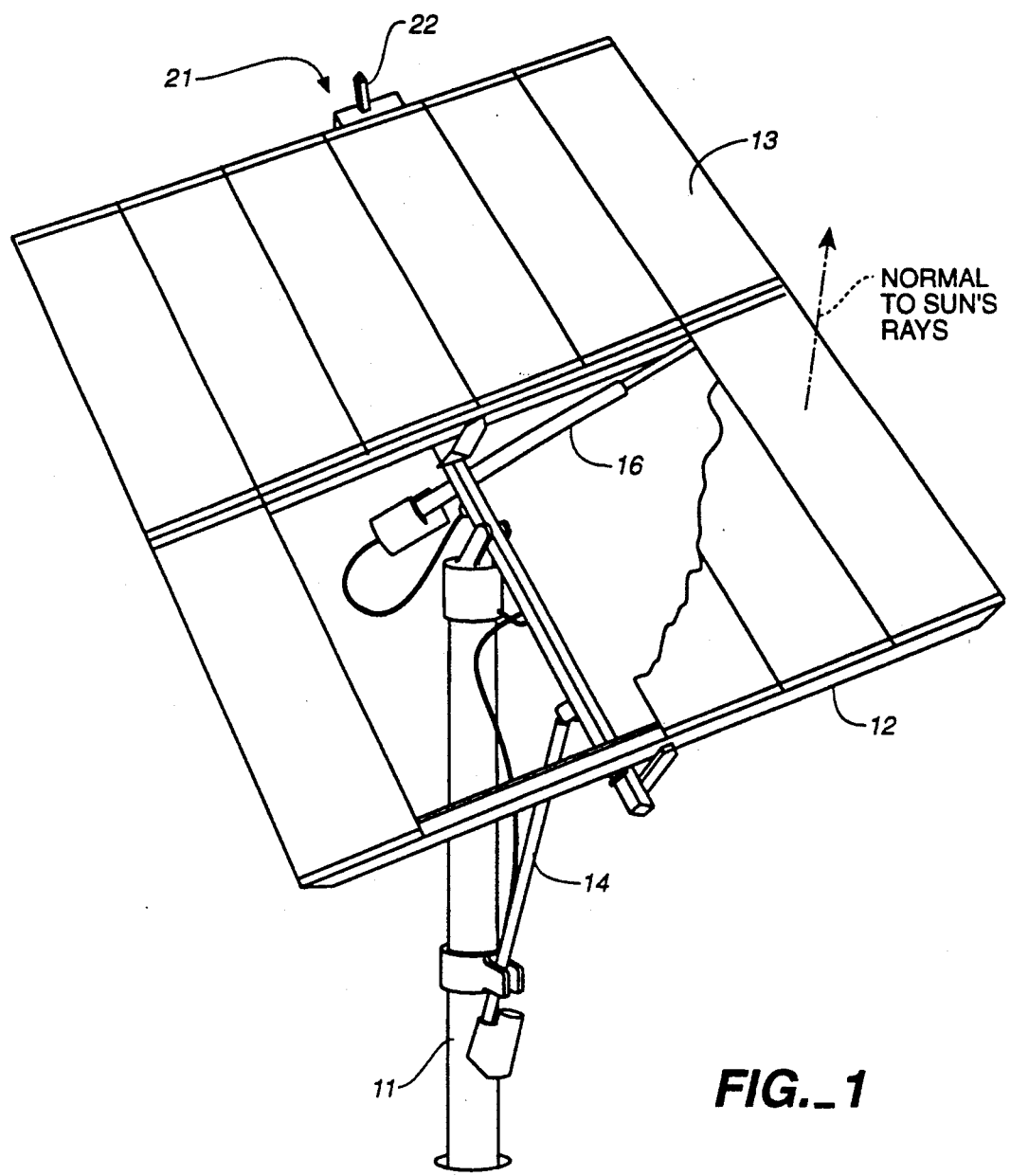
FIG._1

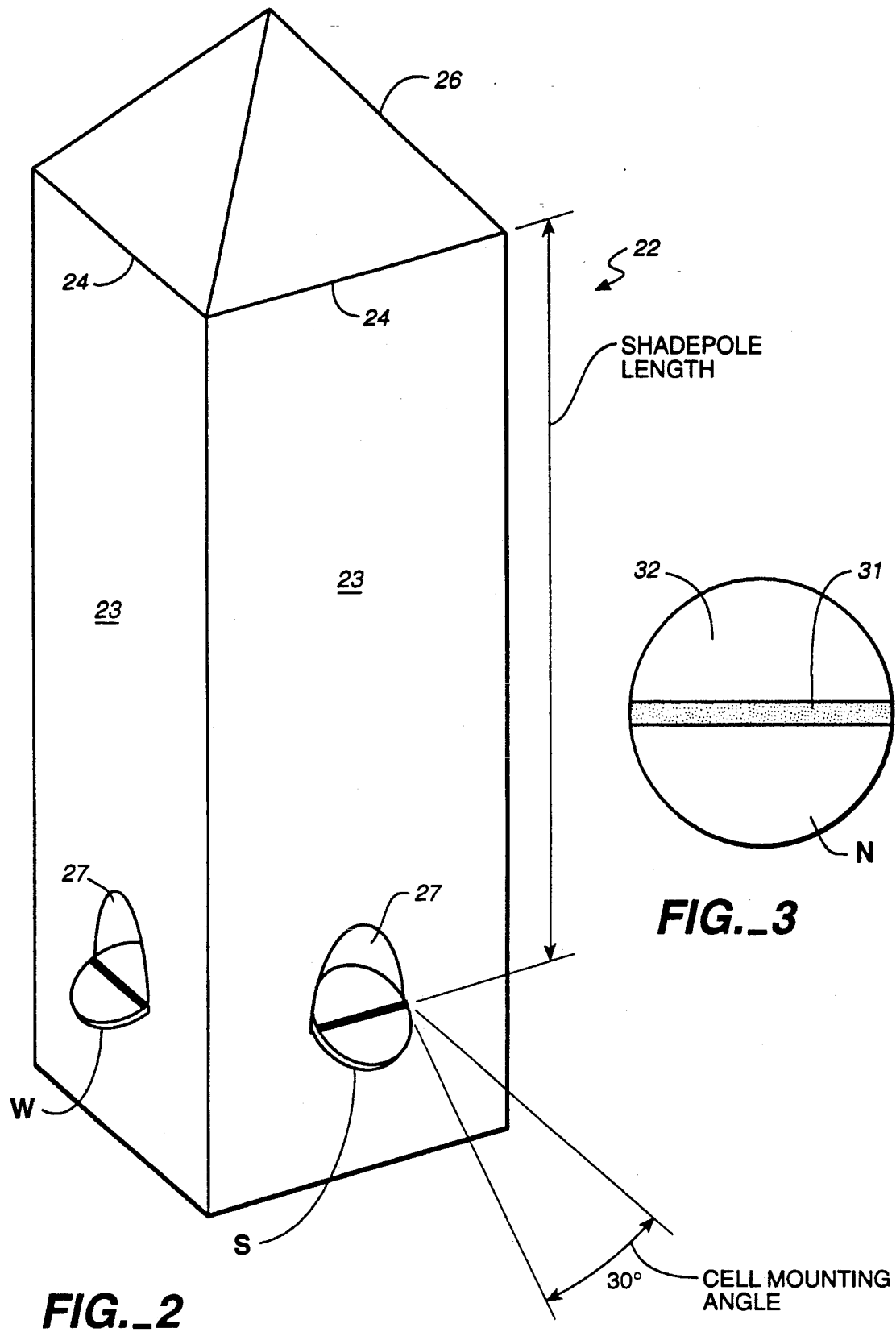

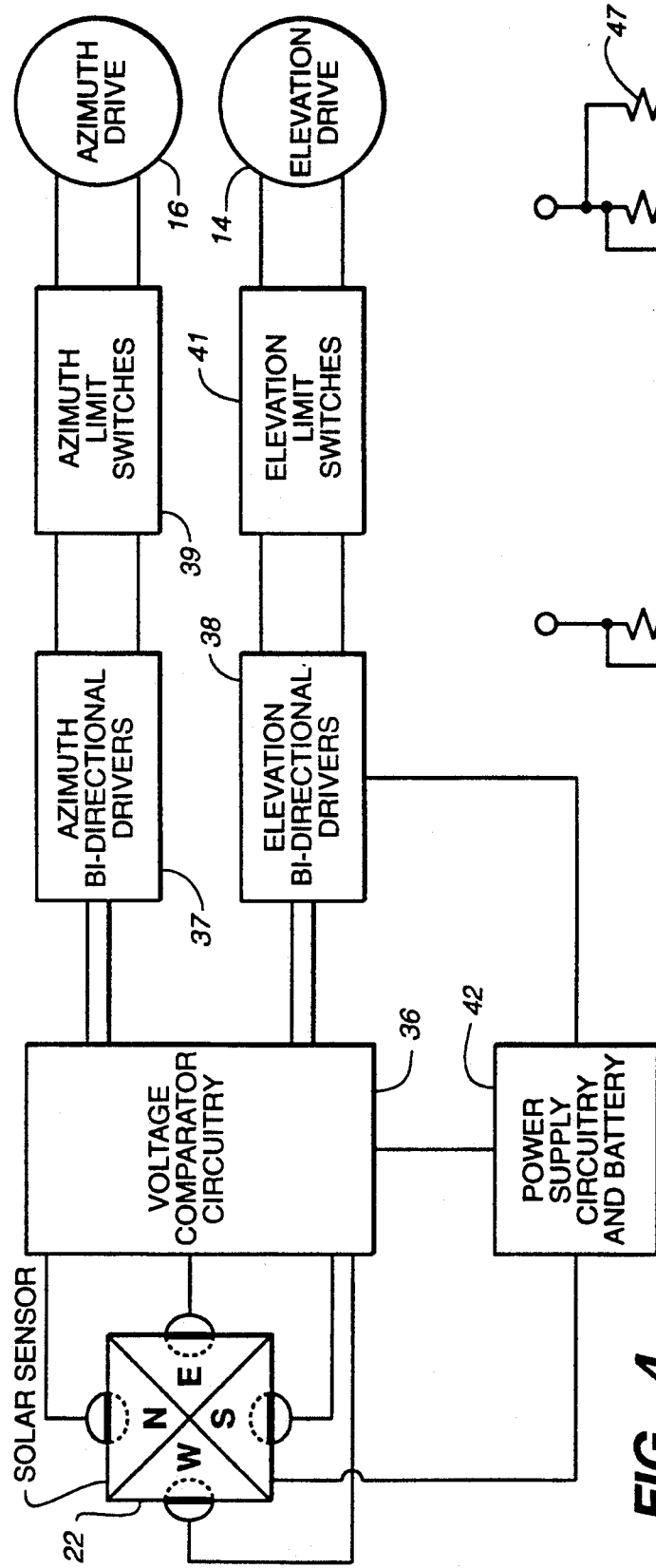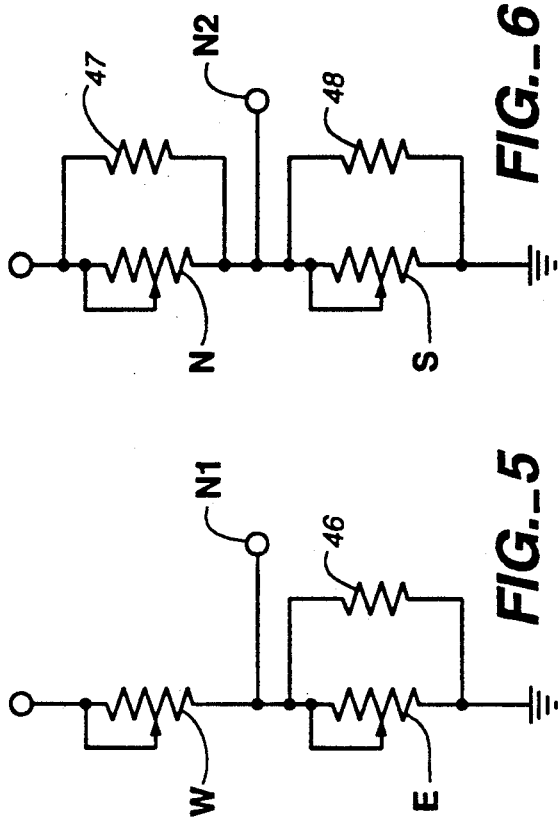

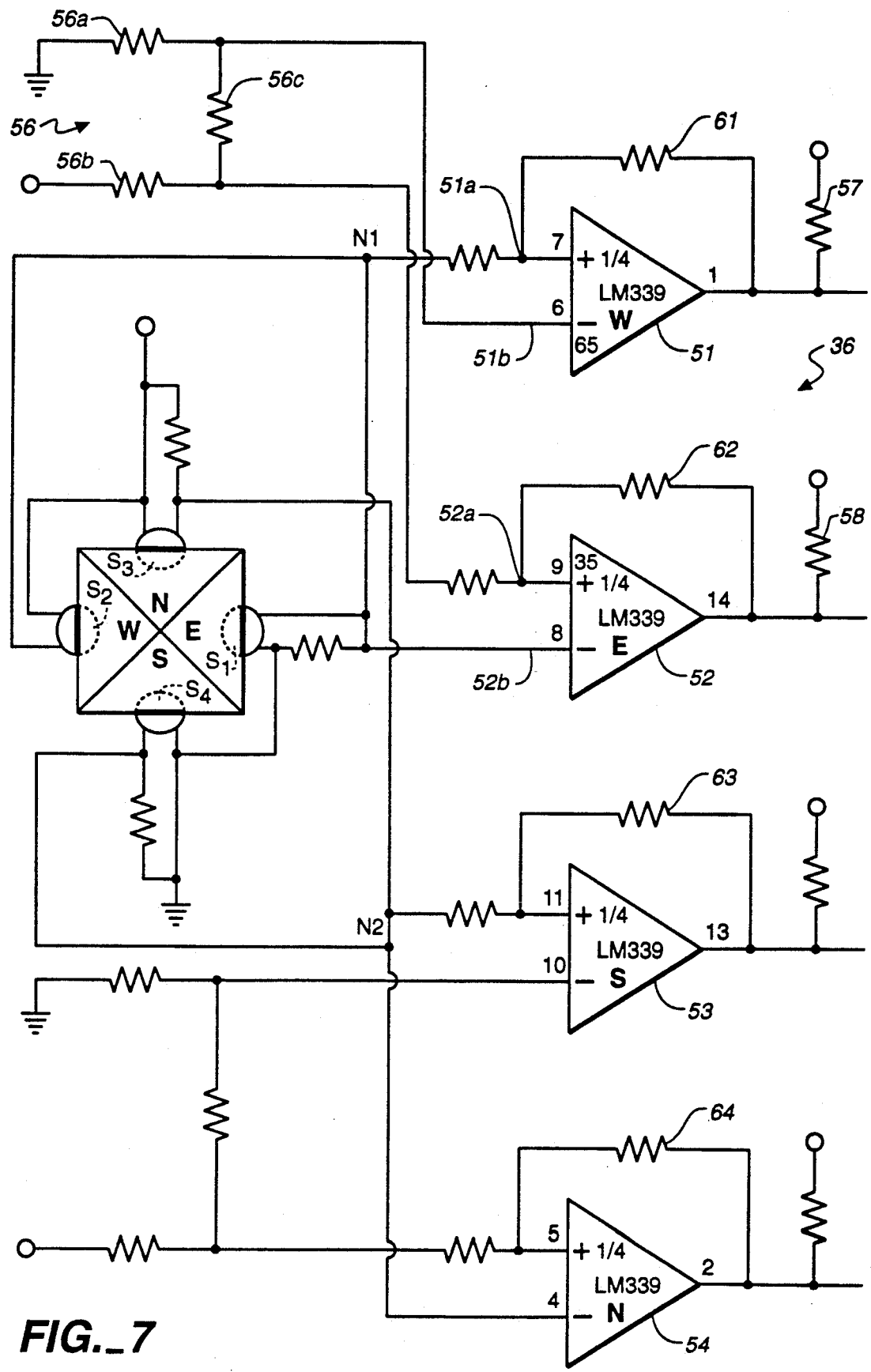
FIG._7

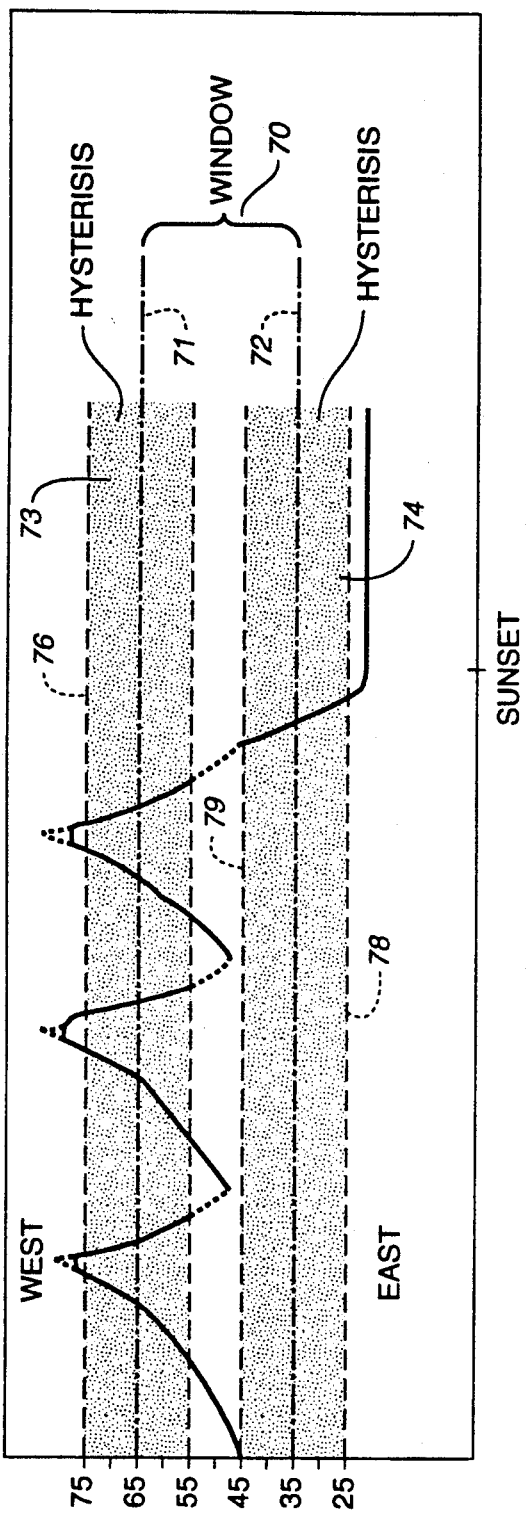
FIG._8
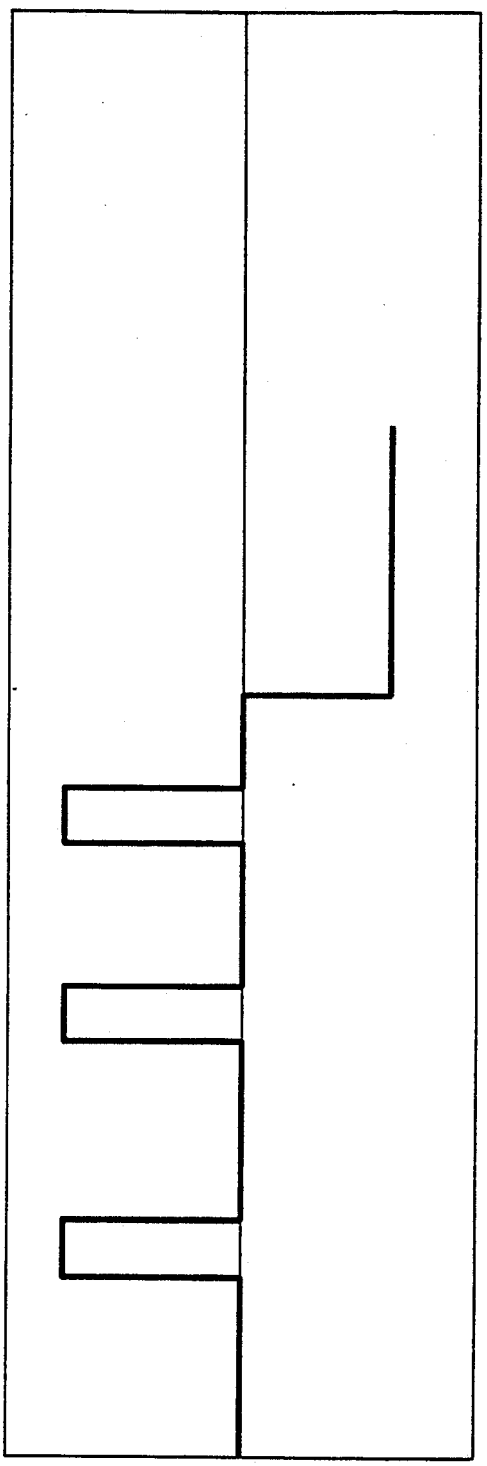
FIG._9

RADIATION SOURCE DETECTOR AND TRACKER CONTROL HAVING A SHADE POLE AND RADIATION RESPONSIVE SURFACE IN THE SHAPE OF NARROW BANDS

This is a continuation of copending U.S. application Ser. No. 07/815,385 filed on Dec. 31, 1991 now abandoned.

BACKGROUND OF THE INVENTION

The present invention relates to methods and apparatus for tracking the sun and more particularly, to methods and apparatus by which a photovoltaic panel or any other sun energy conversion device can be positioned to capture the maximum useful radiation available from the sun as it makes its diurnal trek across the skies.

While the present invention will be presented in the context of tracking the radiation from the sun, the invention is applicable to tracking of radiation of other sources as well, as will be apparent to those versed in the art, and as will be obvious from the description which follows.

It has long been recognized that for the most efficient generation of electrical energy from solar radiation it is necessary for the converting apparatus to track the path of the sun. Numerous schemes have been devised for achieving this goal, but prior to the present invention, none has provided a truly practical solution.

Tracker controls using freon as the active medium are known in the art, but are characterized by unreliability in even ideal atmospheric conditions and outright inoperability when either the temperature or the wind conditions are adverse, and are virtually useless for concentrator collectors where accuracies of less than five degree are demanded.

Highly sophisticated, computer-driven trackers which employ a database to calculate the position of the sun at any given instant of time for a particular location on the planet have also been devised, but are only experimental and have not found any commercial success whatsoever due to their extremely high cost and periodic need for calibration.

The present invention, for the very first time, provides methods and apparatus for tracking the sun which are simple in design and inexpensive to produce, while at the same time precise to within a fraction of a degree under any temperature conditions or windy weather, as well as more ideal conditions. In addition, the present invention provides a tracking device which is self-powered, instantly recognizes atmospheric conditions which affect the collection of solar radiation and modifies its operation to best suit those conditions, prevents elevation "skying" in diffuse radiation conditions and automatically returns to the east after sunset.

An additional object of the invention is to provide a low cost, high precision tracker control that tolerates imbalances in sensor pairs due to manufacturing tolerances, environmental conditions and aging.

Accordingly, it is an object of the present invention to provide a low-cost, highly accurate control system for a solar tracker which maximizes the gathering of solar energy.

It is a further object of the present invention to provide a method for controlling the position of a solar collector to maximize the amount of solar radiation that it collects.

Yet another object of the present invention is to provide a control system for a solar tracker that automatically recognizes a variety of atmospheric conditions affecting the collection of solar radiation and modifies the tracker's operations to best suit those prevailing conditions.

Another object of the invention is to provide a method and apparatus by which a solar tracker will automatically return to an east position after the sun sets.

Yet a further object of the present invention is to provide methods and apparatus for solar tracking that will prevent the elevation control from "skying" in diffuse light conditions.

Other objects and advantages will appear from the following description of a preferred embodiment of the invention and the novel features will be particularly pointed out in the claims.

BRIEF DESCRIPTION OF DRAWINGS

FIG. 1 is a an isometric view of a solar tracker for photovoltaic panels incorporating the control system of the invention;

FIG. 2 is an isometric view of a shade pole and sensors embodying the present invention;

FIG. 3 is an enlarged plan view of a sensor shown in FIG. 2;

FIG. 4 is block diagram flow chart illustrating the overall operation of the invention;

FIG. 5 is a schematic circuit diagram of the east-west (azimuth) sensors with automatic return to east;

FIG. 6 is a schematic circuit diagram of the north-south (elevation) sensors with automatic "skying" prevention;

FIG. 7 is a schematic circuit diagram of the sensors and comparator circuit;

FIG. 8 is a graph depicting the control signal from the (azimuth) sensors relative to the movement of the sun; and FIG. 9 is a graph depicting the periods of operation of the azimuth driver relative to the control signal of FIG. 8.

SUMMARY OF THE INVENTION

In the present invention, two pair of specifically cadmium sulfide (CdS) sensors control a simple electronic circuit that in turn controls two actuators that position a tracker along its elevation axis and its azimuth axis. As will be obvious, the invention is applicable to a single axis system as well.

The active areas of the sensors have the geometry of a band which is narrow relative to the length of a shade pole (a band of between 25 and 100 thousandths of an inch wide for a 4 inch shade pole, for example), and are mounted in relation to a shade pole such that when the shade pole points directly at the sun (is "on track"), each of the narrow bands is partially in shade and partially in sunlight. The sensors, shade pole, and electronic circuit are all mounted on the tracker for movement therewith. As the sun moves along its path across the sky, the shadow cast by the shade pole also moves, altering the balance of received solar radiation between the sensor pairs. The electronic circuit, including the sensors, responds to a signal generated by movement of the shade pole shadow over a portion of the sensor bands to operate the actuators which move the tracker to a position in which the shade pole once again casts a shadow that balances the radiation to the sensors. Because sensor pairs are used in a way that one receives more sunlight when the other receives less, the system enjoys a strong signal from slight shadow movement. Furthermore, by aligning the edge of the shade pole shadow parallel to the length of the sensor band and by initiating realignment when the shadow has travelled a fraction of the width of the band, reliable signals are available to operate the control circuit, but spurious light sources of no significant solar radiation will not be recognized.

Further, any error in alignment due to imbalances in the sensors themselves will only be minuscule as more fully described below.

In the present invention, the CdS sensors are selected to have resistance values that vary over a wide range (e.g. 500 ohms to 50 megohms) in response to varying amounts of solar radiation. As the amount of solar radiation increases, the resistance decreases, and visa versa. Typically such a sensor will have a resistance of 500 ohms in bright sun light and 5,000 (5K) ohms in shade of such bright sun light. Higher resistive values occur in diffuse and reflected light conditions.

To make use of the variable resistive characteristic of these CdS photo sensors, each pair is placed in electrical series across a fixed voltage source (the system's voltage supply, for example). It is the voltage at the node between the sensors (which reflects the ratio of the resistance of the sensors for a sensor pair) that produces the control signal which operates the remainder of the system. When, for example, the shade pole is pointed directly at the sun and casts a shadow that bifurcates each sensor, the resistance values of the sensors are equal and the voltage at the node will be 50 percent of the system voltage. As the sun travels its course, the shadow of the shade pole will increase the sunlight on one sensor and decrease the sunlight on the other so as to change the ratio of their resistances (one increasing in value while the other decreases in value). This ratio change is reflected by a variation in the voltage at the node. When the voltage at the node reaches a pre-determined value, one (or both) of the actuators is operated to change the position of the tracker which changes the position of the shade pole until the balanced state of sun and shade on each sensor is reestablished. Thus, as the sun makes its continuous diurnal journey across the sky, the controller of the present invention causes the tracker to follow the sun in short, discrete steps. As will become more evident by the description which follows, the frequency of these steps is dependent on a number of factors and is varied to match different demands or conditions.

Because the CdS sensors are used to establish a ratio as opposed to an absolute value and because the sensors have a wide range of resistance values, they can automatically account for atmospheric conditions and alter the system's operation in response thereto. When, for example, the sun is partially obscured by clouds and the solar radiation is partially diffused, the shadow created by the shade pole will also diffuse (decrease) and therefore it will take a greater movement of the shade pole shadow to create sufficient imbalance to induce tracker realignment and thus, the frequency of actuator movement of the tracker is diminished. Since, when the sun's radiation is partially diffuse, greater off-track error can be tolerated without affecting the radiation collected to any appreciable degree, the fact that the alignment occurs less frequently is appropriate for the conditions and reduces the activity of the tracker to just that which is needed. In a more extreme case where cloud cover completely obliterates the sun and solar radiation is diffuse and essentially equal throughout the sky (all that is present is diffuse light), there is little point at all in attempting to track the position of the sun. Under those conditions, the sensor pairs will receive approximately the same amount of radiation regardless of the position of the shade pole, and what difference does exist will not produce a sufficient ratio change in the sensors to initiate any tracker movement. As is appropriate for those conditions, the tracker remains fixed while the panels collect whatever diffuse radiation is available. When the sun reappears, a signal will be generated by which the tracker will be realigned to be on track with the sun.

Thus, the present invention by its unique arrangement of components automatically adjusts for atmospheric conditions without the necessity of employing independent sensors and circuits for that purpose.

Except at the equator, the sun's elevation is substantially less than 90 degrees to the horizon for much of its diurnal path. When this is the case, trackers using sensor pairs are prone to "skying"—the elevation is driven upward—when diffuse light conditions occur. For example, when the elevation is around 45 degrees, the north sensor (upper) sees only sky, whereas the south sensor (lower) sees a good deal of earth landscape. The elevation will be correctly maintained in bright sunlight as described above, but when the light becomes diffuse, the lower sensor will receive significantly less radiation, causing an imbalance that can drive the elevation skyward. Since, under diffuse light conditions, the panels receive nearly the same amount of radiation for any elevation that includes the sky, there is only a minuscule gain in radiation collection as a result of the tracker wandering skyward. The present invention eliminates this unwarranted tracker operation. This is achieved simply in the present invention by connecting in parallel with each of the elevation sensors a resistor of the same fixed value. When the light level drops (diffuse light conditions), the parallel resistors dominate over the sensors, and determine the output signal, and the resistors being equal, the signal does not initiate movement of the tracker.

A simple resister connected in parallel with the east-looking sensor provides the system with an automatic return to the last direction after sunset. This resistor has a high value, but lower than the sensor resistance value in the darkness after sunset. Thus, when the sensor resistances climb as the sun sets, the added resistor will combine with the east-looking sensor resistor to stay below value of the fixed resistor (the formula for calculating the resistance of two resistors in parallel is well known) while the west-looking sensor continues to increase in resistance. This will cause the voltage signal to drop until the panel is driven eastward. The panel will continue eastward (the movement will not re-balance the sensors in this case) until a limit switch is engaged and stops the drive. The panel will be in the azimuth position to see the rising sun, and be at the elevation of the setting sun, which, in most cases, will be very close to that of the next day's rising sun.

DETAILED DESCRIPTION OF THE PREFERRED EMBODIMENTS

Referring to FIG. 1, a pole 11 supports a movable frame 12 carrying a number of electricity-generating photovoltaic solar energy conversion panels 13. The elevation of frame 12 (and thus, the panels 13) is adjustable in one axis by an elevation actuator drive (driver) 14 while the frame is adjustable in another axis by an azimuth actuator drive (driver) 16. The conversion of solar energy into electricity is most efficient when the panels 13 are maintained essentially normal to the rays of the sun.

A controller 21 is affixed to and moves with frame 12 and includes a shade pole 22 which casts a shadow that moves with the sun's movement relative to the panels 13.

The photovoltaic panels that convert sunlight into electricity are well-known in the art and include "flat-plate" panels and "concentrator" panels. Flat-plate photovoltaic panels, which do not use focusing lenses, do not require tracking of the precision demanded of panels using concentrator lenses which focus the sunlight onto a limited photovoltaic area. While it is advantageous to faithfully track the sun even where flat-plate converters are being used, the drop-off in collection efficiency for such panels is negligible for tracking errors of several degrees, as compared to concentrator panels which demand, for efficient operation, tracking accuracies of from 5 degrees to less than 1/10 of a degree.

The present invention provides a method and apparatus for tracking the sun with such extreme accuracy that the demands of high power concentrators are fully met and the maximum efficiency of energy collection achieved. Where such extreme accuracy is not required (such as in the case of flat-plate converters), the invention through a very simple adjustment can operate in a more "relaxed" mode while still maximizing solar radiation gathering.

As the sun makes its diurnal trek across the skies, the shadow cast by the shade pole 22 makes it own journey which is sensed and converted into an electrical signal that operates the actuators 14 and/or 16 to position the frame 12 and the panels 13 at the sun to maximize the radiation received.

Referring to FIGS. 2 and 3, the shade pole 22 is a generally right cylinder having a square cross section defined by four rectangular exterior plane surfaces 23 (only two of which are shown in FIG. 2), each of which includes a shadow-casting edge 24. The tip 26 of shade pole 22 is formed in the shape of pyramid to discourage birds from using the shade pole as a resting place and otherwise serves no tracking purpose.

A recess 27 (or cut-out, depending on whether the shade pole is solid or tubular) in each of the exterior plane surfaces 23 provides a location for mounting one of the four sensors N, S, E or W, which detect the movement of the shadow cast by the shade pole 22 (as more fully described below), and initiate a correction signal for actuating one of the actuators 14 or 16 to reposition the frame 12 for alignment of the panels 13 toward the sun.

Each of sensors N, S, E and W is a cadmium sulfide (CdS) photo-conductive cell having an active area (aperture) 31 in the shape of a narrow band extending across the diameter of the face of the cell. It is this active area 31, and only this area, of the cell that responds to changes in the amount of solar radiation received; the remainder of the surface 32 of the cell being essentially inert.

Each sensor cell N, S, E and W is mounted in its respective recess 27 at a sensor angle that tilts the plane of the active surface areas 31 between 20 and 60 degrees (and preferably approximately 30 degrees) to a line normal to surface 23. By so positioning each surface 31, each sensor has a "wide-angle view" (almost 120 degrees) in the direction in which it faces, as compared to a highly focused view for a surface 31 positioned, for example, at 90 degrees to the pole surface 23. This wide angle view is essential to permit the tracker to realign with the sun after having suspended operation during times when the sun is obscured by atmospheric conditions. The sensors N, S, E and W are thus able to both locate the sun anywhere in the sky and maintain alignment of the panels with the sun within a small fraction of a degree without requiring other additional sensors to perform one or the other of these tasks.

Each sensor, in addition to being angularly disposed within its recess 27 so as to have a "wide-angle view" is also positioned within its recess such that the active area 31 is intersected (and preferably bifurcated) by the plane of its associated shade pole surface 23. Each sensor is thus partially in the shade and partially in the sun when the shade pole 22 is "on track" (points directly at the sun).

The sensitivity of the system can be adjusted in a number of different ways including by varying the angular orientation of the sensor active area 31 relative to the edge of the shadow cast by the shade pole 22 (or the plane of surface 23). The system is most responsive to shadow movement and thus, maintains the greatest accuracy of alignment when the length of active area 31 is parallel to the shade pole shadow line. In this orientation, when the shadow line moves in response to movement of the sun it travels across the active area 31 at a maximum rate and thus, at a maximum change in ratio of shaded area to sunlit area for a given incremental movement of the shadow. If, by contrast, the active area 31 is rotated 90 degrees so that the shadow line falls across the width (short direction) of the band 31, then each incremental movement of the sun will produce the minimum ratio change of sunlit area to shaded area. Any response between this maximum or minimum can be achieved by simply having the active area 31 at some angular orientation between 0 degrees and 90 degrees relative to the shadow line. Shapes other than bands or rectangles can produce even other response relations.

For flat-plate collectors, peak efficiencies are achieved even where the sun is permitted to travel several degrees off track before the panels are realigned, whereas for concentrator panels off-track errors of less than one half of a degree are demanded if significant efficiency losses are to be avoided. Thus, for flat-plate converters, the sensor alignments would be more toward having the shadow line fall across the short dimension of the sensitive active area 31 so as not to require that the tracker make so many adjustments over the period of a day and thus, not require that it work so hard. For concentrator panels, the degree of sensitivity required would be dependent to some extent on the magnification of the concentrators, but will usually benefit by the sensors being in their most responsive alignment (shadow line and active area 31 parallel).

The sensors N, S, E, and W operate in pairs, each pair being mounted in opposing surfaces 23 of shade pole 22. As the sum moves westerly across the sky, the shadow on the west-facing sensor W will move so as to expose more of the sensitive area 31 to the sun, while the shadow moving across the east-facing sensor E will increase the amount of shadow falling on its sensitive area 31 in approximately the same amount. Thus, the photo-conductive imbalance between sensors E and W is a result of both the increase in one and the decrease in the other. The north-south facing sensors N and S operate similarly.

As will be more fully described below, when the imbalance in resistance between a pair of sensors reaches a predetermined value an actuator 14 or 16 is activated to drive the tracker back toward the "on track" position. The present invention enjoys many of its advantages as a result of actuator movement being initiated when the shadow line has traversed a particular fraction of the active area 31. That is, when the length of active area 31 is parallel to the shadow line, as well as when it is perpendicular to the shadow line, or any angle therebetween, realignment is initiated after the shadow line moves through a substantial portion, but only a fraction of the active area 31.

Cadmium sulfide photo-sensitive cells are well known and have the general characteristic that their electrical resistance, varies inversely with the amount of solar radiation received. Cells can be selected to have particular radiation verses resistance curves. In the present invention, the active area 31 is selected to have a resistance of tens of megohms in the total absence of sunlight, a resistance of approximately 500 ohms when radiated with bright sunlight and a resistance of 5K ohms in the shade of bright sun light.

Referring to FIG. 5, the east sensor E and west sensor W are illustrated as variable resistors in electrical series across the system voltage supply (any voltage source or fixed value). The voltage at the node N1 between resistors E and W provides the control signal which is fed to the rest of the system for controlling the azimuth of the frame 12 (FIG. 1). When the shade pole 22 is aligned with the sun and the active areas 31 of each of sensors E and W are half in shade and half in sun (see FIG. 4) the resistances of E and W will be equal and the voltage at N1 will be 50 percent of the system voltage. As the sun moves westwardly the shade line will expose more of sensor W to solar radiation and cast more of sensor E into shade. The resistance of sensor E will increase while the resistance of sensor W will decrease, causing the voltage at N1 to rise. The sensors N and S are electrically arranged identically to the sensors E and W (see FIG. 6) and produce their own independent control signal as well at N2.

The voltage at N1 is a function not of the absolute value of resistance of either sensor W or sensor E but rather the ratio of those resistances. This feature enables the present invention to operate in a mode consistent for the prevailing conditions without requiring an independent sensor to determine the conditions.

For example, under a cloudless sky the voltage at N1 changes most rapidly in response to the sun's movement, since the resistance of a sensor is a function of both the area irradiated and the intensity of the radiation. This is the operation desired to assure that the alignment of the tracker is most accurate when the sun is brightest and off-track errors can result in the loss of significant useful radiation.

On the other hand, when the sun is obscured by clouds and the sunlight is partially diffuse (and therefore less intense), a greater movement of the sun (off-track error) will occur before the ratio necessary to initiate realignment of the panels is established. This, too, is appropriate since in diffuse light, the useful radiation received by the panels is not materially affected for a somewhat larger off-track error. In the condition where the sun is fully obscured and there is only diffuse light, it may not be possible to achieve any significant shadow and thus, the sensors will remain closely enough balanced that the panels will remain stationery. This also is appropriate since, if the light is diffuse, the panels will receive as much radiation from one orientation toward the sky as any other and there is no energy gain by attempting to track the obscured sun.

Thus, in the present invention the use of resistance variable sensors in electrical series across the system power supply establishes a means for not only detecting movements of the sun and producing an electrical signal responsive thereto, but also for automatically varying that response with variable atmospheric conditions so that the system works only as hard as it needs to in order to achieve the desired goal of maximizing the amount of electrical energy produced from the available solar radiation.

In the present invention, as the radiation diminishes in intensity (sunlight becomes more diffuse), the response is less precise and the system makes fewer mechanical adjustments in a given period of time. Prior art systems characteristically increases sensitivity with decreasing light which can lead to a number of undesirable effects, including driving the system into oscillation or alignment with a bright non-solar radiating object other than the sun. Since there is no energy gain to be achieved by having the tracker "chase" after ersatz sun sources (such as reflected sunlight on clouds during a cloudy day), the present invention's automatic desensitization to such conditions adds to its stability and overall efficiency.

Referring to FIG. 4, a voltage comparator circuit 36 receives the electrical outputs of the sensor pairs E-W and N-S and analyzes the signals to determine whether or not a correction should be made in the position of the tracker. If the voltage comparator circuit 36 determines that conditions require the tracker to be moved westwardly, for example, it sends a signal to an azimuth bi-directional driver circuit 37 which in turn activates the azimuth actuator 16 to position the panels 13 and shade pole 22 towards the west into closer alignment with the sun. When the voltage comparator circuit 36 determines that a pre-set alignment has occurred, the drive 16 is de-activated and the panel stops moving. Voltage comparator circuit 36 operates identically for the north-south sensors in that it responds to an imbalance of a predetermined amount by sending a signal to elevation bi-directional driver circuit 38 which in turn activates elevation drive 14 to change the elevation to re-establish a balanced condition. An azimuth limit switch 39 and an elevation limit switch 41 prevent the drivers from positioning the panel 12 beyond a predetermined limit as will be more fully described below.

A power supply circuit 42, including a battery, provides the voltage necessary to operate the sensors, the voltage comparator circuit 36, the driver circuit 37 and 38, and the drivers 14 and 16. The power supply circuit, including battery recharging, is energized by electrical energy produced by the panels 13. Therefore, the overall efficiency of the system is enhanced by minimizing the amount of actuator drive activity which uses panel-generated electricity. Toward this end, the present invention only positions the panels 13 when to do so will increase the useful radiation collected by the panels.

It is highly desirable in a solar tracker to have the tracker return to the east after the sun goes down to a position that "sees" the morning sun on the following day. Numerous ways of achieving this result have been proposed in the prior art, including the use of timers and dedicated sensors and drive mechanisms for that purpose alone. None, however, has achieved the result with the simplicity and dependability of the present invention.

Referring to FIG. 5, a resistor 46 connected in parallel with sensor E provides the present invention with the desirable east return feature. As previously described, the voltage at node N1 provides the signal which determines if a panel position change will be made. At the end of the day, after the sun sets, the last of the sunlight is all diffuse (reflected) and of low intensity causing the values of resistors E and W to increase together towards their darkness maximum of several tens of megohms. In the absence of resistor 46 under the conditions of the sun having set, the resistances of sensors E and W would be essentially equal and the voltage at N1 would remain at 50 percent, not signaling the need for an alteration of the position of the tracker.

The parallel resistor 46 which has a value in the high end of the range of resistance of the sensors (10 megohms, by way of example) comes into play under these sunset conditions. As darkness increases the resistance of sensor W will continue to increase until it surpasses that of resistor 46. The combination of the resistance of sensor E and resistor 46 will not rise above the resistor 46 value and thus, the voltage at node N1 will start to decrease as the resistance of sensor W does increase above the value of resistor 46. At the point where the voltage at node N1 decreases to a predetermined level, an imbalance will be indicated that comparator circuit 36 responds to by activating the azimuth drive 16 in an eastward direction. Since the eastward movement of the panels and shade pole will not restore balance (as it does when it follows the sun), the driver will continue to move the panels eastward until the azimuth limit switch 39 has been engaged at which point the driver 16 will be deactivated and the panel will stop. The azimuth limit switch is most advantageously located so that the panels 13 stop moving eastwardly approximately at the location in which they face the position where the sun will rise the following morning. The photo-resistive characteristics of sensors E and W are selected to not reach resistive values in the tens of megohm range during daylight, even on the cloudiest of days. Thus, the east-returning mechanism will only become operative after the sun has set and true darkness begins to set in.

Referring to FIG. 6, sensor N and sensor S are connected in electrical series across the system voltage supply in precisely the same manner as described for sensors E and W and generate a signal at the node N2 between them. Unless otherwise provided for, there is a natural tendency of systems employing sensor pairs, such as the present invention, to drive the elevation control skyward whenever diffuse light conditions occur. While such "skying" does not necessarily decrease the energy collection efficiency of the panels, it also does not increase it, and thus, it is unnecessary mechanical activity of the tracker which is best avoided. In the present invention, this is achieved by a resistor 47 having a fixed resistance near the low end of the range of sensor resistance (10K, for example) connected in electrical parallel across sensor N and a resistor 48, of the same resistance value as resistor 47, connected in electrical parallel across sensor S.

For a good part of the day, the elevation of the sun during its diurnal path is substantially less than 90 degrees above the horizon. Sensor S is disposed on shade pole 22 to view the sky between the sun and the horizon and, thus, for much of the day necessarily includes within its view a significant portion of the earth's landscape. When the sun is bright (as in a cloudless sky), both sensors will see the sun and the resistances of sensors N and S will be in their low range and their ratios will control the voltage at N2 as if resistors 47 and 48 were not present. When, however, the atmospheric conditions cause the sun's light to become diffuse through out the sky, the amount of radiation received by sensor N (which views the sky above the sun) will be significantly greater than that received by sensor S (which sees a much smaller portion of the sky). In the absence of resistors 47 and 48, the increase of radiation to sensor N as compared to that of sensor S would increase the voltage at N2 sufficiently to drive the tracker skyward until sensor S viewed as much sky as sensor N. Since this would not materially increase the amount of radiation received by the panels 13, it would amount to a meaningless adjustment of the tracker, which the present invention seeks to avoid. Resistors 47 and 48, having resistive values in the low range of resistances of sensors N and S, have the effect of maintaining the voltage at N2 in a balanced state (parallel resistors combine according to the formula $R = R_1 R_2/R_1 + R_2$) as the resistances of sensors N and S increase as a result of the sun being obscured and its radiation diffused. Thus, resistors 47 and 48 have the effect of keeping the panels 13 at an elevation consistent with bright sunlight even when the solar radiation is diffuse. In this way, the present invention avoids needless elevation changes ("skying"), thereby conserving panel energy and mechanical wear and tear.

Referring to FIGS. 7 and 8, voltage comparator circuit 36 comprises a first pair of comparators 51 and 52 which are connected to sensors E and W and a second pair of comparators 53 and 54 which are connected to sensors N and S.

As previously described with reference to FIG. 4, it is the function of comparators 51 and 52, for example, to establish a voltage "window" 70 (FIG. 8) and respond to the voltage at N1 by energizing the azimuth drive when a predetermined value at N1 is detected. The comparators 51 and 52 establish one of three conditions: no azimuth drive activity when N1 voltage is within the window; azimuth drive westerly when the voltage at N1 is higher than the upper edge 71 of the voltage window (more sun on sensor W than sensor E); and azimuth drive eastwardly when the voltage at N1 is below the lower edge 72 of the voltage window. Comparators 51 and 52 establish these three conditions in the following way. The voltage at comparator input 51a follows the voltage at node N1 (see FIG. 5), and the voltage at input 51b is set by a bridge circuit 56 comprised of resistors 56a, 56b and 56c, which bias the input 51b with a voltage that is a fixed percent of the source voltage. When the voltage at input 51a exceeds the voltage at input 51b, azimuth drive circuit 37 (see FIG. 4) is energized in a way that the actuator 16 will drive the tracker to the west. When the voltage at input 51b exceeds that at 51a, no signal is sent to circuit 37 and driver 16 remains stationary. The bridge circuit 56 establishes a voltage at input 51b which is the upper edge 71 of the window and is, therefore, more than 50 percent of the system voltage (for example, 65 percent). When sensors E and W are balanced and the voltage at N is 50 percent of the system voltage (within the window), comparator 51 will be biased to maintain the driver 16 quiescent.

Comparator 52, on the other hand, has an input 52a that is biased at the reciprocal of the bias at input 51b of comparator 51 (35 percent using our example of 65 percent at 51b) whereas its input 52b is at the node N1 voltage between the sensors E and W. Comparator 52 thus sends no activator signal to circuit 38 and driver 16 until the voltage at N1 is less than 35 percent—the lower edge 72 of the window.

The choice of values for resistors 56a, 56b and 56c determine the bias at 51b and 52a and thus, the upper and lower edges of the window and the degree of imbalance between sensors E and W which must exist before a signal is sent to activate the azimuth driver to realign the tracker. In the example suggested, the bias at input 51b is 65 percent of system voltage, requiring that the voltage at node N1 increase above 65 percent before any change will occur in the output of comparator 51. This window provides the invention with the important capability to see but not respond to non-solar radiation sources of light which are not strong enough to drive N1 out of the window. Yet the window (as will be more fully described below) does not prevent the invention from keeping the tracker within a fraction of a degree of the sun.

The characteristics of the CdS active area 31 (see FIG. 3) come into play in determining what bias voltage the bridge circuit 56 should apply to the comparators 51 and 52 to achieve the most advantageous operation of the invention. As previously described, the present invention enjoys some of its more outstanding advantages when a correction signal is generated after the shadow line has traversed a particular fraction of the photo-sensitive area 31. Bias voltage established by circuit 56 determines precisely how much of that area must be traversed before either comparator 51 or 52 sends a signal which activates driver 16. Assuming, by way of example, a 65−35 percent bias at inputs 51b and 52a respectively, the comparators will send a signal to activate the azimuth driver if either the voltage at node N1 increases above 65 percent of the system voltage (as a result of increased sunlight on sensor W and decreased sunlight on sensor E) or the voltage at node N1 and input 52b decreases below 35 percent of the system voltage (east return after sunset). A signal from comparator 51 to the azimuth driver results in the panels 13 being driven westwardly while a signal from comparator 52 results in the panels 13 being driven eastwardly. The operation of sensors N and S and comparators 53 and 54 is essentially the same.

By way of example, if the selected maximum off-track error for bright sun light is "X" degrees (from a small fraction of a degree to a few degrees) and a shade pole of "Y" inches in height is used (4 inches is typical and practical), a shade line from the shade pole will travel "Z" inches (in thousandths) along the active area band 31 when the off track error goes from zero to the selected maximum. Because the correction signal generated by a sensor pair is dependent upon both an imbalance in the areas of the sensors being irradiated and the intensity of the radiation, the width of the band is most advantageously 4Z inches to 8Z inches in the direction of the shadow travel.

If the band is less than 4Z inches, operation under all conditions will not be possible, and there will be insufficient latitude to accommodate imbalances that might occur in the sensors themselves. If the band width is greater than 8Z inches the signal established for off track error will be less reliable and the system will become more susceptible to being driven by sources of radiation not productive to generate electricity.

If the movement of the shade line of Z inches in bright sunlight generates a correction signal, the width of the band must be at least 2Z inches (since it starts in the middle). But, if the band is only 2Z inches, then no correction signal will be possible in partially diffuse conditions where the shade line must move more than Z inches to establish a signal, (since the reduced radiation intensity requires greater irradiation area imbalance to generate the same correction signal). Thus, by providing a band of at least 4Z inches width, there will be at least 2Z inches of distance for the shadow to travel within the sensor active area, and tracking can continue in diffuse light. In the present invention, the decrease in frequency of tracker realignment (greater allowed off-track error) as the light diffuses is not only not detrimental to the ultimate goal of maximizing solar radiation collection, but, rather, has the important advantage of reducing the tracker's mechanical activity to just that required, which will extend the mechanical life of the tracker.

By selecting a sensor photo-resistive band 31 having a width of more than 4Z inches, tracking can be extended into more diffuse light conditions and also the sensors will be able to self correct for imbalances that might occur between sensor pairs due to environmental conditions or aging. If, for example, one sensor should become partially obscured by a film of dirt or debris, the radiation received by the sensor pair would not be equal when the collector was on track. In addition, the intensity of the radiation seen by that sensor would be diminished. Thus, movement of the shadow line would not produce the same resistance ratio change for the partially occluded conditions as in the absence of the dirt or debris. To achieve the imbalance required to establish a signal for tracker realignment will require greater travel of the shadow line and the "on track" position will no longer be exactly on track. The compensation is possible due to the additional Z inches of width of the band.

Referring to FIGS. 7 and 8, in order to keep the drivers from being driven into oscillation at the upper and lower window edges 71 and 72, a hysteresis feedback loop (a resistor bridged) is provided around each comparator; loop 61 for comparator 51, loop 62 for comparator 52, loop 63 for comparator 53 and loop 64 for comparator 54. These feedback loops spread the edges of the windows from discrete voltages values to a voltage band 73 about the window edge 71 and voltage band 74 about window edge 72. Now, the upper edge 76 of the hysteresis band 73 for the upper window edge must be exceeded by the voltage at N1 to drive the comparator into its driver activation mode. The lower edge 77 of the same hysteresis band must be crossed as voltage at N1 decreases to turn the driver off.

For the lower window edge 72, the lower edge 78 of the hysteresis band 74 must be crossed as N1 voltage decreases to activate its associated driver 16 while the upper edge 79 must be crossed as N1 voltage increases to turn the driver off. The value of the resistor in the hysteresis loop around each comparator determines the widths of the hysteresis band. Thus, by way of example, if the upper window edge is 65 percent and the hysteresis is 20 percent (10 percent on either side of 65), then a driver will be activated when N1 exceeds 75 percent and stay activated until N1 drops back below 55 percent.

In addition to the comparator circuit signal to the drivers, the mechanical inertia of the tracker contributes to the position of the panels after a correction or realignment has been completed. That is to say, that after a driver signal is turned off and the driver in no longer energized, it will continue to glide for a distance due to inertia. This effects the position of the shade pole shadow and thus the balance of radiation on the sensors and therefore the voltage at node N1, for example.

Thus, it becomes apparent that the width of the hysteresis determines the frequency of off-track corrections, while the width of the window determines the sensitivity of the system to extraneous light sources. The greater the spread between the upper and lower edges of the window (including the hysterises) the more the system is de-tuned to incoming radiation. The window size thus becomes an adjustable parameter that permits the invention to be closely tailored to the precise conditions where the tracker is to be used. If for example, there are structures in the area where the tracker is operating that might reflect the suns radiation, a large window will detune the system to such inputs and thereby keep the tracker from being drawn to align with the reflection which has no meaningful electricity generating potential.

Referring to FIGS. 8 and 9, a system having a window 70 with an upper edge 71 at 65 percent and a lower edge 72 at 35 percent and a hysterises band 73 of 20 percent about upper edge 71 and a hysterises band of 20 percent about the lower edge 72, responds to the westward movement of the sun as follows. As the sun moves westwardly, the voltage at N1 (and thus at comparator input 51a) will rise as more sun falls on sensor W and less falls on sensor E, until the upper edge 76 of the hysterises band 73 is traversed at the 75 percent level. At that point the actuator 16 is activated to drive the panels westwardly (FIG. 9) toward the sun causing the sunlight on sensor W to decrease and the sunlight on sensor E to increase causing the voltage at N1 to drop. The driver 16 stays activated and driving the panels westwardly until the voltage at N1 drops below 55 percent (the lower edge 77 of the hysterises band 73) at which point the driver is deactivated. The panels do not stop at that point, however, but continue to "glide" for a distance due to mechanical inertia, as represented on FIG. 9 by the dashed lines extending below the 55 percent lower edge of the hysterises band 73. The glide will take the sensors further west and thus to or even below the 50 percent line. Once the driver does stop, the relentless westward movement of the sun will drive the N1 voltage back up for another cycle. This process is repeated throughout the day with the driver 16 being periodically activated to drive the panels westwardly in small increments. If the sun light becomes diffuse, the rise in N1 voltage will be more gradual as will be its fall as the driver pushes the panels to the west. The time between driver activations will be greater and the maximum off-track error experienced will also be greater. As explained above, this is precisely the operation desired since in diffuse light greater off-track errors can be tolerated without appreciable loss of collected radiation.

Widow 70 must be wide enough to permit the tracker to glide without pushing the voltage below the lower edge 78 of the hysterises band 74, otherwise the system will oscillate.

It is also by virtue of the window width that non-solar light sources are unable to attract the attention of the system since they will be insufficient to drive the voltage beyond the window limits (above 75 percent or below 25 percent for the example given). Edges of clouds reflecting sunlight while the sun is obscured by a cloud, reflection off of a near-by object or the ground (when wet or snow-covered) or a bright moon are all possible attractants of the tracker and have plagued prior art devices. The window 70 (including the hysterises) set by the comparator circuit prevents any radiation unable to drive the voltage at the node N1 outside the window from driving the tracker. Thus, while the brightest spot in the sky may be the reflection of the sun on the edge of a cloud, that bright spot will not cause a well-defined shadow to fall on the sensors which are otherwise balances by the diffuse light conditions. In the absence of such a shadow, the node N1 voltage will not move far enough off 50 percent to get out of the window and cause the tracker to be repositioned. But at the same time, the system is extremely sensitive to changes in position of the sun enabling the tracker to be accurate (on track) within a small fraction of a degree. depending on the width of the hysterises band selected.

If the window 70 is too narrow, the system becomes susceptible to hunting for extraneous light sources (small imbalances can drive the node voltage out of the window) as well as "hunting" where mechanical "glide" due to inertia can push the tracker past the on-track point to where the other edge of the window is traverse and the tracker driven in the other direction.

When the sun sets and darkness sets in, the voltage at N1 will begin to drop as the east return resistor 46 (FIG. 5) takes effect. When the voltage drops below 25 percent (see FIGS. 8 and 9) the driver 16 will be activated to drive the panels eastwardly. The eastward movement in the dark will not cause the balance at the sensors to change so the voltage at N1 will stay below the 25 percent level (lower level 78 of the hysterises band 74) until the limit switch 39 (FIG. 4) is engaged to turn the driver off. At this point the panels are positioned at the location where the sun will rise in the morning. The elevation will normally be essentially correct as well by virtue of the resistors 47 and 48 (FIG. 6) fixing the elevation at the location where the sun was last able to cast a clear shadow.

It is by maintaining a proper relationship between the geometry of the shade pole and sensors and the electronic parameters that the present invention is able to continuously provide extreme accuracy using only low cost components and without requiring constant maintenance. More specifically, the sensor pairs do not have to be highly matched even though the basis of the system is that the sensors act identically. The system in fact is not only able to operate at its rated error level with sensors which are manufactured with only a plus or minus 25% tolerance, but is able to continue to so operate even if the sensors become unbalanced due to environmental conditions (such as obscuring debris on one sensor) or uneven aging.

One requirement is that there be a fairly high ratio of resistance between a sensor in full sun and in the shadow of full sun. For a sensor having a full sun resistance of 500 ohms, the shade resistance should be at least 5 and preferably 10 times that value, e.g., 5K ohms.

The likely imbalances between a pair of sensors includes a plus or minus 10% for manufacturing tolerances, a plus 10% for dirt build-up on one sensor over another (dirt build-up can only add resistance) and a plus or minus 5% for aging. Thus, the total accumulated imbalance that can be expected is plus 25% or minus 15%. Assuming an even worse case of plus or minus 25%, then the sensor imbalance would cause the ratio of the sensor resistances to be 6250 (5K×1.25) to 3750 (5K×0.75) rather than 50/50 when the shade pole was directed at the sun. In order for this imbalance to be absorbed by the system (and not drive it) the window 70 (FIG. 8) established by the comparator circuit must have an upper level above 62.5% and the lower level below 37.5%. This permits the sensor imbalance to exist but not drive the voltage at node N1 (for example) out of the window. A larger window further permits ersatz light sources to contribute to the sensor out puts without driving the node voltage out of the window. Thus, a 70/30 or greater window prevents the combination of sensor imbalances and extraneous light sources from operating the drivers independent of sun movement.

Because the sun is a disc in the sky and not a point, the shade line caused by the shade pole has a calculable shade diffusion thickness ($S_D$) according to the formula: $S_D = 0.00464 \times$ shade pole length. For a four inch shade pole this calculates to 0.0186 inches. To achieve maximum sensor sensitivity (resistance change per unit of shadow movement) the apature (width) of the reactive area 31 must be at least $3 \times S_D$, and no less than the width required to permit the system to correct for internal imbalances and still be able to correct for sun movement.

With the forgoing established, it is possible to calculate to maximum error angle ($M_{ea}$) that will result from the accumulation of all the possible imbalances discussed above.

$$M_{ea} = \left[ \text{Tan}^{-1} \frac{\text{Apature} \times \text{cos of mounting angle of sensor}}{\frac{\text{length of shade pole}}{\text{shade attenuation}}} \right] \times .5 \text{ Imbal.}$$

By way of example, if the imbalance of each sensor is 45% (25% for manufacturing tolerances, environmental conditions and aging plus 20% for reflection); the comparator window is 70/30 (which includes a safety factor for diffuse light conditions); shade pole length of 4 inches; sensor aperture of 0.1 inches; a sensor angle of 30 degrees; a sensor shade attenuation of 10 (500 ohms to 5K ohms); then $$M_{ea} = .0279 \text{ degrees} + \frac{1 + \text{sensor imbalance} \times \frac{1}{2} \text{ window}}{\text{shade attenuation}} =$$

$$M_{ea} = .0569 \text{ degrees}.$$

This is a perfectly acceptable error for the needs of even the most demanding solar tracker. In practice, the error will be much smaller since the accumulation of the various error factors to create the maximum error is unlikely.

The combination and interrelation of the shade pole and sensor geometry and the selection of characteristics for the sensors, the electronic window and hysteresis established by the comparator circuit enable the present invention to use the same stable and reliable sensors to track the sun with extreme precision and at the same time suppress signals from sources of light that are not meaningful sources of solar radiation (or what ever other radiation is being tracked). The result is a tracker that maximizes the collection of solar radiation with the least amount of tracker activity. The tracker moves only when to do so increases the radiation being collected. All other movements of the tracker are eliminated.

Implicit in the description of the apparatus of the invention is the method of the invention which includes unbalancing a resistive bridge circuit as a function of the amount by which a radiation detector (panel of photovoltaic cells) deviates from being normal with respect to the sun; moving the panel so as to restore it to being normal to the sun when the imbalance of the bridge exceeds a predetermined ratio; sensing the level of solar radiation; increasing the degree of deviation of the panel from normal to the sun required for the resistive bridge to exceed the predetermined ratio as the sensed level of solar radiation decreases. Additionally the method contemplates suspending movement of the panel in one direction when the sensed level of solar energy falls below a lower limit, or initiating continuous movement of the panel in one direction when the sensed level of solar energy falls below a lower limit. Further the method includes the selection of window parameters and the use of the same sensors to precisely align the tracker and to modulate the response of the system as a function of radiation intensity.

The various features and advantages of the invention are clear from the descriptions. Various other features and advantages not specifically enumerated will undoubtedly occur to those versed in the art, as likewise will many variations and modifications of the preferred embodiments illustrated, all of which may be achieved without departing from the spirit and scope of the invention as defined by the following claims.

I claim:

1. In a radiation source detector the combination comprising:
   a shade pole casting a shadow of the radiation source; and
   a first radiation responsive surface in the shape of a narrow band more than 0.00464 times the shade pole length and less than 0.75 inches wide disposed partially in and partially out of the shadow of said shade pole.

2. The invention of claim 1 further comprising:
   electronic circuit means, including said radiation responsive surface, operable in response to movement of the shadow line across less than one half of said radiation responsive surface to generate an electrical alignment correction signal.

3. The invention of claim 2 wherein:
   said radiation responsive surface is cadmium sulfide which assumes an electrical resistance value that is at least five times greater in the shade of full sun than when in full sun.

4. The invention of claim 3 further comprising:
   a second radiation responsive surface essentially identical to said first radiation responsive surface disposed partially in and partially out of the shadow of said shade pole and located relative to said shade pole such that movement of the shadow line which increases radiation received by said first radiation responsive surface decreases by the same amount the radiation received by said second radiation responsive surface, and conversely, movement of the shadow line which decreases radiation received by said first radiation responsive surface increases by the same amount the radiation received by said second radiation responsive surface.

5. The invention of claim 4 wherein:
as the radiation from the radiation source diffuses, said electronic circuit means is operable to automatically increase the degrees of movement of the radiation source relative to said shade pole required to generate an electrical alignment correction signal.

6. The radiation source detector of claim 4 wherein: said electronic circuit means is operable when the level of radiation from the radiation source detected by said radiation responsive surfaces falls below a preset amount to prevent any electrical alignment correction signal from being generated.

7. The radiation source detector of claim 4 wherein: said electronic circuit means is operable when the amount of radiation from the radiation source detected by said radiation responsive surfaces falls below a preset amount to generate a continuous electrical alignment correction signal.

* * * * *